US007288589B2

(12) United States Patent
Piro et al.

(10) Patent No.: US 7,288,589 B2
(45) Date of Patent: Oct. 30, 2007

(54) PIGMENT DISPERSIONS FOR SOLVENTBORNE COATINGS WITH IMPROVED RHEOLOGY

(75) Inventors: Bonnie D. Piro, Swedesboro, NJ (US); Frank Rohrbacher, Wilmington, DE (US)

(73) Assignee: E. I. du Pont de Nemours & Company, Wilmington, DE (US)

( * ) Notice: Subject to any disclaimer, the term of this patent is extended or adjusted under 35 U.S.C. 154(b) by 241 days.

(21) Appl. No.: 10/320,242

(22) Filed: Dec. 16, 2002

(65) Prior Publication Data

US 2004/0122160 A1 Jun. 24, 2004

(51) Int. Cl.
*C08L 53/00* (2006.01)
*C08L 39/00* (2006.01)
*B32B 27/28* (2006.01)
*B32B 27/20* (2006.01)

(52) U.S. Cl. ........................ 524/505; 524/555; 428/500
(58) Field of Classification Search ................ 524/504, 524/505, 555; 428/500, 511
See application file for complete search history.

(56) References Cited

U.S. PATENT DOCUMENTS

| 4,200,720 | A |   | 4/1980 | Evani et al. |   |
|---|---|---|---|---|---|
| 4,394,486 | A | * | 7/1983 | Chattha et al. | 525/162 |
| 5,035,972 | A | * | 7/1991 | El-Sayed et al. | 430/114 |
| 5,104,767 | A | * | 4/1992 | Nakamura | 430/138 |
| 5,272,201 | A |   | 12/1993 | Ma et al. |   |
| 5,565,297 | A | * | 10/1996 | Larson et al. | 430/115 |
| 5,786,042 | A | * | 7/1998 | Inoue et al. | 428/1.3 |
| 5,801,738 | A | * | 9/1998 | Stoffel et al. | 347/100 |
| 5,846,307 | A | * | 12/1998 | Nagasawa et al. | 106/31.75 |
| 5,914,206 | A | * | 6/1999 | Takasaki et al. | 430/7 |
| 6,037,414 | A |   | 3/2000 | Simms et al. |   |
| 6,413,306 | B1 |   | 7/2002 | Kraiter et al. |   |
| 6,451,950 | B1 |   | 9/2002 | Ma |   |
| 6,472,463 | B1 | * | 10/2002 | Ma | 524/504 |
| 6,743,848 | B2 | * | 6/2004 | Nakahara et al. | 524/529 |

FOREIGN PATENT DOCUMENTS

| EP | 732346 A1 | * | 9/1996 |
| EP | 1 182 218 A1 |   | 2/2002 |
| EP | 1 295 922 A2 |   | 3/2003 |
| JP | 04215830 A | * | 8/1992 |
| JP | 2001172521 A |   | 6/2001 |
| JP | 2001172522 A |   | 6/2001 |
| JP | 2002-031713 A | * | 1/2003 |
| WO | WO 02/48268 A1 |   | 6/2002 |
| WO | WO 02/48269 A1 |   | 6/2002 |

OTHER PUBLICATIONS

Machine Translation of JP 2002-031713 A (2002).*
Wypych, George; Handbook of Fillers 2nd Ed., ChemTec Publishing, Toronto, 2000 (p. 269).*
International Search Report (PCT/US 03/40021) dated Nov. 6, 2004.

* cited by examiner

*Primary Examiner*—Callie Shosho
(74) *Attorney, Agent, or Firm*—Kevin S. Dobson

(57) ABSTRACT

A pigment dispersion with improved rheology useful for forming solventborne paint compositions is disclosed. The dispersion comprises a copolymer pigment dispersant having at least one quaternary ammonium functional group; a pigment having a pH below 7.0; and an organic liquid carrier. The dispersion is particularly useful for forming colored exterior finishes for automobiles and trucks.

11 Claims, No Drawings

PIGMENT DISPERSIONS FOR SOLVENTBORNE COATINGS WITH IMPROVED RHEOLOGY

FIELD OF THE INVENTION

This invention relates to pigmented solventborne coating compositions useful for finishing the exterior of automobiles and trucks, and in particular to liquid solventborne pigment dispersions for use therein with improved rheology to facilitate paint manufacture and spray application.

BACKGROUND OF THE INVENTION

Liquid pigment dispersions are widely used in formulating pigmented exterior colored solventborne paints for automobiles and trucks. The finish of choice currently being used on automobiles and trucks is a clear coat/color coat finish in which a clear coating is applied over the pigmented colorcoat or basecoat to provide protection to the colorcoat and improve the appearance of the overall finish particularly gloss and distinctness of image. It is well known that pigments used need to be ground to small particle size and dispersed in a liquid for use in paints. Finely ground pigment, necessary for color and appearance, has a tendency to clump together resulting in paints with poor color development and non-uniform appearance. It is also well known that the rheology of such pigment dispersions has a dramatic effect on the paint spray viscosity and final appearance of the paint film. One major concern is that if rheology is not maintained at proper levels, the desired paint appearance is not attained.

This is a well known problem. Attempts to solve this problem in the past have included the use of polymeric pigment dispersants, especially polymeric dispersants containing quaternary ammonium groups, to stabilize the finely ground pigment particles. Generally such systems successfully stabilize particles but proper rheology control has not been uniformly attained. Another solution that others have previously adopted is to lower the pigment loadings in the paint. While the spray viscosity can be maintained at desired levels using this approach, this technique leads to paints with lower hiding power that require spray application at higher film builds to achieve the desired color and effect, which is time-consuming and expensive.

Accordingly, there is still a need to provide pigment dispersions wherein the dispersion rheology can be maintained at the desired levels throughout the shelf life of the paint.

SUMMARY OF THE INVENTION

The present invention provides pigment dispersions having improved rheology particularly adapted for use in pigmented solventborne paints useful for finishing the exterior of automobiles and trucks, the pigment dispersion comprising:

(a) a copolymer pigment dispersant having at least one quaternary ammonium functional group;
(b) a pigment having a pH below 7.0; and
(c) an organic liquid carrier.

The invention is based on the discovery that rheology of pigment dispersions formed using dispersants containing quaternary ammonium groups is highly sensitive to the pH of the pigment. Accordingly the dispersion rheology can be maintained at desired levels by selecting appropriate pigments that have the required pH level.

The invention also includes a method for controlling the rheology of pigment dispersions containing copolymer dispersants bearing quaternary ammonium groups.

Solventborne paint compositions containing a pigment dispersion according to the above composition, a process for coating substrate with the forgoing paint composition, and a substrate having adhered thereto a coating according to the above composition also form part of this invention.

The pigment dispersions of this invention are particularly useful for forming solvent borne color coat or base coat compositions for clear coat/color coat finishes for automobiles and trucks.

DETAILED DESCRIPTION OF THE INVENTION

The pigment dispersions of this invention are particularly suitable for forming pigmented solventborne paint compositions in general, and pigmented solventborne paint compositions used for finishing the exterior of automobiles and trucks in particular. The pigment dispersions are adapted to have improved rheology to facilitate paint spray application.

By the term "improved rheology", it is meant that the low shear viscosity of the dispersion will remain significantly lower with acidic pigments compared to non-acidic pigments through the lifetime of the dispersion. Preferably, the low shear viscosity of the dispersion of the present invention will remain during its lifetime below about 10,000 Cps (centipoises), preferably below about 1,500 Cps when measured on a Brookfield viscometer using a #2 spindle at 20 rpm at 25° C. Other rheometers can also be used. As will be appreciated by those skilled in the art, the viscosity unit of measure, centipoises is equivalent to mPas (milliPascal seconds) in SI units. By "low shear", it is meant that the shear rate is preferably within the range of 0.01 to 100 $sec^{-1}$.

Copolymer Dispersant

The dispersants used in this invention consist of copolymer pigment dispersants having at least one quaternary ammonium functional group. The copolymer dispersants that are used in this invention are copolymers that are soluble or at least partially soluble in the organic medium of the composition. Acrylic copolymer dispersants are most preferred. Such copolymers generally include at least one pigment adsorbing segment that contains at least one quaternary ammonium functional group and at least one stabilizing segment. Not to be held to any particular theory, it is thought that the adsorbing segments function, in part, to link with the appropriate pigment, while the stabilizing segments function, in part, to disperse the pigment in the organic liquid medium.

The adsorbing segment is preferably composed of polymerized ethylenically unsaturated monomers, primarily polymerized acrylate and methacrylate monomers as are listed hereinafter, and also contains (preferably up to about 40% by weight, based on the total weight of the adsorbing segment) of polymerized ethylenically unsaturated monomers having the desired quaternary ammonium groups, that enhance the pigment binding force, or ethylenically unsaturated monomers such as amino group containing monomers, that can be converted to quaternary ammonium groups. The quaternary ammonium groups work particularly well for dispersing pigments with acidic groups, while still producing relatively low viscosity dispersions, as desired herein.

Suitable monomers that can be used to form the adsorbing segment include but are not limited to alkyl (meth)acrylates having 1-12 carbon atoms in the alkyl group such as methyl acrylate, ethyl acrylate, propyl acrylate, isopropyl acrylate, butyl acrylate, pentyl acrylate, hexyl acrylate, 2-ethylhexyl acrylate, nonyl acrylate, lauryl acrylate, methyl methacrylate, ethyl methacrylate, propyl methacrylate, isopropyl methacrylate, butyl methacrylate, pentyl methacrylate, hexyl methacrylate, 2-ethylhexyl methacrylate, nonyl methacrylate, lauryl methacrylate, and the like, and any mixtures thereof. Cycloaliphatic (meth)acrylates can also be used such as cylcohexyl (meth)acrylate trimethylcyclohexyl (meth)acrylate, isobutylcyclohexyl methacrylate, isobornyl (meth)acrylate, and the like. Aromatic (meth)acrylates can also be used such as benzyl (meth)acrylate, napthyl (meth)acrylate, phenoxyethyl (meth)acrylate, and the like, and mixtures thereof. Other polymerizable monomers that can be used are styrene, alpha-methyl styrene, (meth)acrylamide and (meth)acrylonitrile monomers.

There are a number of techniques that can be used to form the quaternary ammonium groups on the adsorbing segment. However, amine functional monomers are preferably used herein for forming the quaternary ammonium functional groups. The concentration of the quaternary ammonium groups may vary from case to case depending on the desired degree of pigment anchoring required for the particular end use application. Generally, concentration of the pigment anchoring group in the dispersant copolymer should be at least about 1% by weight, based on the total weight of the copolymer. At lower concentrations, there may not be sufficient interaction with the pigment to avoid flocculation, particularly in more polar solvents. The preferred concentration is between about 2 and 30% by weight. However, at higher concentrations, generally above 20% by weight, low polarity solvents may not be satisfactory solvents for the dispersants.

These anchoring groups can be, and preferably are, attached to the copolymer by contacting tertiary amine functional groups built into the adsorbing segment with an alkylating agent. Total alkylation should be at least about 30% of the tertiary amine moieties, preferably at least about 50%, most preferably 100% or as close to 100% as is reasonable to avoid excess alkylating agent. In cases where the tertiary amine is not alkylated, it is anticipated that the unreacted tertiary amine may also provide some stabilization to the pigment particles. The synthesis of copolymers in which one of the segments produced contains tertiary amine functionality is well known. For example, the tertiary amine functionality can be obtained by direct polymerization of ethylenically unsaturated monomers which contain pendant tertiary amine groups. Acrylic monomers are generally preferred. Preferred monomers include N,N-dimethylaminoethyl acrylate, N,N-dimethylaminoethyl methacrylate, N,N-diethylaminoethyl acrylate, N,N-diethylaminoethyl methacrylate, N-t-butylaminoethyl methacrylate, 2-N-morpholinoethyl acrylate, 2-N-morpholinoethyl methacrylate, and the like. Vinyl monomers can also be used, such as 4-dimethylaminostyrene, 2-vinyl pyridine, 4-vinyl pyridine, and the like. These cationic precursor units are preferably converted to the quaternary state after the formation of the basic copolymer structure by bringing the cationic precursor unit into contact with conventional alkylation agents, such as aralkyl halides, alkyl halides, alkyl toluene sulfonate, or trialkyl phosphates halides. Alkylation agents which have been found to be particularly satisfactory include, benzyl chloride, methyl toluene sulfonate, and dimethyl sulfate.

Other possibilities for attaching the forgoing quaternary ammonium anchoring groups to the dispersant copolymer will be apparent to persons skilled in the art.

As indicated above, the stabilizing segment is preferably soluble in the selected organic carrier medium of the composition, and is therefore primarily composed of polymerized ethylenically unsaturated monomers. Any of the monomers listed above for use in the anchoring segment may also be used in the stabilizing segment. Acrylates and methacrylates are generally preferred.

In addition to the quaternary ammonium groups, the copolymer dispersant may also include other functional groups in either or both the stabilizing or adsorbing segment. For example, ethylenically unsaturated monomers with crosslinkable groups, such as hydroxy groups, can be copolymerized in the stabilizing portion, provided they are used at a concentration that will not drastically change the solubility properties of the stabilizing portion in the selected organic carrier medium. These groups can be designed to react with film forming components present in the paint composition and enable the copolymer dispersant to become a permanent part of the final film network in reactive systems and prevent deterioration of the film upon weathering as may occur if it were an unreacted component of the film. Suitable monomers for crosslinking purposes include hydroxyalkyl (meth)acrylate monomers having 1-4 carbon atoms in the alkyl group (such as hydroxyethyl acrylate or methacrylate, hydroxypropyl acrylate or methacrylate, and the like). Depending on the polymerization process, these monomers along with the acid monomers may have to be blocked with silane during polymerization to prevent side reactions and then unblocked by a reaction with alcohol or water, as is well known in the art.

The acrylic copolymer dispersants that are selected to advantage in practicing the invention have a number average molecular weight (Mn) of about 1,000 to about 100,000 (preferably about 2,000 to about 40,000). The adsorbing segment preferably has a number average molecular weight (Mn) of about 1,000 to about 10,000 (preferably about 1,000 to about 5,000) and the stabilizing segment has a number average molecular weight (Mn) of about 1,000 to about 15,000 (preferably about 1,000 to about 5,000). Higher molecular weights undesirably increase the viscosity of the resulting pigment dispersion. All molecular weights referred herein are determined by GPC (gel permeation chromatography) using polystyrene as the standard.

The location of the adsorbing segment and the stabilizing segment in the acrylic polymer dispersant may vary depending upon the structure of the acrylic copolymer dispersant. Acrylic polymer dispersants used in the present invention may be random or structured copolymers, such as block or graft copolymers, with block or graft copolymers being preferred.

A block copolymer used in the present invention may have an AB diblock structure, or ABA or ABC triblock structure, for example. At least one of the blocks, A, B or C must be an adsorbing segment. At least one of the blocks, A, B or C must be a stabilizing segment.

Graft copolymer dispersants used in the present invention have a backbone segment and a side chain segment. Either a backbone segment or a side chain segment must be an adsorbing segment. Either a backbone segment or a side chain segment must be a stabilizing segment. Preferably a backbone segment is an adsorbing segment and a side chain segment is a stabilizing segment.

Random copolymer dispersants used in the present invention have both adsorbing segments and stabilizing segments randomly distributed in the polymer chain. These dispersants are typically functionalized polyacrylate copolymers with number average molecular weights ranging from 1,000 to 50,000, preferably, 2,000 to about 10,000.

Acrylic AB, ABA or ABC block copolymer dispersants can be advantageously prepared by using a stepwise polymerization process such as anionic, group transfer polymerization (GTP) taught in U.S. Pat. No. 4,508,880, Webster et al., "'Living" polymers and process for their preparation", herein incorporated by reference, atom transfer radical polymerization (ATRP) taught in U.S. Pat. No. 6,462,125, White et al., "Pigment dispersions containing dispersants prepared by controlled radical polymerization having hydrophilic and hydrophobic segments", herein incorporated by reference and radical addition fragmentation transfer (RAFT) taught in U.S. Pat. No. 6,271,340, Anderson, et al. "Method of controlling polymer molecular weight and structure" herein incorporated by reference. Polymers so produced have precisely controlled molecular weight, block sizes and very narrow molecular weight distributions.

The graft copolymers may be prepared by a macromonomer approach using the special cobalt chain transfer (SCT) method reported in U.S. Pat. No. 6,472,463, Ma, the disclosure of which is herein incorporated by reference.

Random copolymers can be prepared using conventional free radical polymerization techniques as described in U.S. Pat. No. 6,451,950, Ma, the disclosure of which is herein incorporated by reference.

The copolymers of this invention that are so produced are broadly compatible with a variety of film forming polymers that are conventionally used in solventborne coatings and in particular, compatible with acrylic polymers that are conventionally used in automotive coatings, selectively adsorbed by the pigments desired, soluble in a wide range of solvents, and not displaced from pigment surfaces by polar solvents.

Besides the acrylic copolymer dispersants, the method of this invention can also be used with other commercially available dispersants. Compatible mixtures of any of the aforementioned dispersants can also be used.

The amount of copolymer dispersant having at least one quaternary ammonium functional group is in the range of approximately 1 to 50%, preferably 2 to 30% by weight of the total liquid dispersion composition. Dispersion stability of the pigment particles is adversely affected if insufficient quaternary ammonium groups are present.

Any of above dispersants might also be used in combination with other compatible dispersants.

Pigment

The term "pigment" as used herein means an insoluble colorant. In order to obtain the desired acid-base interactions with the dispersants and desired dispersion rheology, the pigment of this invention needs to have acidic groups on the surface of the pigment particle, i.e., the pigment must have a pH <7.0. Such pigments are well known in the art. For example, all carbon blacks have chemisorbed oxygenated complexes, primarily acidic in nature, e.g., carboxylic, quinonic, lactonic or phenolic groups, on their surfaces to varying degrees depending upon the conditions of manufacture. These acidic groups on the pigment surface provide binding sites for dispersants with the quaternary ammonium group. Other pigments with acidic surfaces, where either the pigment itself contains acidic groups or its surface has been modified by agents containing acidic groups such as sulfonic, phosphoric, or carboxylic acid groups, are equally useful in this invention. Examples of pigments which may be used to advantage include azo, anthraquinone, thioindigo, oxazine, quinacridone, lakes and toners of acidic dye stuffs, copper phthalocyanine and its derivatives, and various mixtures and modifications thereof.

Organic Carrier Medium

The organic carrier medium comprises an organic solvent or blend. The selection of organic solvent depends upon the requirements of the specific end use application, such as the VOC (volatile organic content) emission requirements, the selected pigment and the selected dispersant. Representative examples of organic solvents which are useful herein include alcohols, such as methanol, ethanol, n-propanol, and isopropanol; ketones, such as acetone, butanone, pentanone, hexanone, and methyl ethyl ketone; alkyl esters of acetic, propionic, and butyric acids, such as ethyl acetate, butyl acetate, and amyl acetate; ethers, such as tetrahydrofuran, diethyl ether, and ethylene glycol and polyethylene glycol monoalkyl and dialkyl ethers such as cellosolves and carbitols; and, glycols such as ethylene glycol and propylene glycol; and mixtures thereof.

The amount of organic carrier medium is in the range of approximately 20 to 90% by weight, based on the total weight of the dispersion, preferably 30 to 60% by weight, based on the total weight of the dispersion, and the balance made up of total solids. As will be appreciated by those skilled in the art, total solids includes pigment, dispersant, grinding aids and other coating conventional components.

Dispersion Properties and Preparation

To form a pigment dispersion or a mill base of this invention, the selected pigments are added to the copolymer dispersant in the customary organic solvent or blend and the pigments are then dispersed using conventional techniques such as high speed mixing, ball milling, sand grinding, attritor guiding, or two or three roll milling for about 5 minutes to 48 hours. Conventional grinding aids such as an acrylic polymer and the usual other additives can also be added to the dispersion to build solids and viscosity without interfering with the pigment dispersant interaction. The resulting pigment dispersion has a dispersant to pigment (d/p) weight ratio of about 1/100 to 500/100, preferably 2/100 to 200/100, and a low shear viscosity below about 10,000 Cps, preferably between 50-10,000 Cps, more preferably the range of 100-1,500 measured on a Brookfield viscometer according to the procedure defined above.

The dispersions of this invention having low viscosity in general can be easily formulated into a paint with low viscosity under high shear environment such as spraying. The paint can be easily pumped through a robotic system or a manual spraying gun to produce the fine liquid paint drops that flows out and gives a good appearance on the substrate. It can also be formulated using known rheology agents to produce a desired low shear viscosity for other important paint properties such sag prevention.

Also, structured polymers are preferred over random polymers, since the structured polymer polymer is an excellent dispersant for the selected pigments and the ratio of polymer to pigment or polymer being dispersed is less than used with conventional dispersants.

Paint Formulations

Solventborne coatings in which the pigment dispersions of the present invention are used usually contain other binder components such as acrylic-based polymers, polyesters, or low molecular weight polyols, or mixtures of them and a crosslinking agent such as melamine resin, blocked polyisocyanate, epoxy resins, silane resins and polyisocyanates in an organic carrier. It may further contain a NAD (nonaqueous acrylic dispersion) binder polymer. These polymers form stable solutions or dispersions in organic solvent, typically as a dispersed polymer having an average particle size diameter of 10 nm to 1 micron, preferably 20 to 400 nm. The coating compositions contain about 10-70%, more typically 15-50% by weight of binder, and about 20-90%, more typically 40-70% by weight, of an organic liquid carrier. Suitable solventbome coatings are prepared by blending other useful components in accordance with normal paint formulation techniques.

Other film forming binder polymers can also be used in these coating compositions such as acrylourethanes, polyesters and polyester urethanes, polyethers and polyether urethanes that are compatible with the dispersion of the branched polymer.

The pigment dispersions of this invention can be used in either unactivated or activated coating compositions. Activated compositions include crosslinking agents which will usually include one or more polyisocyanates, melamines, or a combination thereof.

For example, to form an activated composition which will crosslink under elevated baking temperatures of about 60°-180° C. for about 5-60 minutes, about 10 to 40%, preferably 15 to 30% by weight, based on the weight of the binder, of a solvent soluble alkylated melamine formaldehyde crosslinking agent having 1-4 carbon atoms on the alkylated group is preferably added.

The melamine crosslinking agents are generally partially alkylated melamine formaldehyde compounds and may be monomeric or polymeric or mixtures thereof. Some of the suitable monomeric melamines include low molecular weight melamines which contain, on an average, three or more methylol groups etherized with a $C_1$ to $C_5$ monohydric alcohol such as methanol, n-butanol, or isobutanol per triazine nucleus, and have an average degree of condensation up to about 2 and preferably in the range of about 1.1 to about 1.8, and have a proportion of mononuclear species not less than about 50 percent by weight. By contrast the polymeric melamines have an average degree of condensation of more than 1.9.

Some such suitable monomeric melamines include alkylated melamines, such as methylated, butylated, isobutylated melamines and mixtures thereof. Many of these suitable monomeric melamines are supplied commercially. For example, Cytec Industries Inc., West Patterson, N.J. supplies Cymel® 301 (degree of polymerization of 1.5, 95% methyl and 5% methylol), Cymel® 350 (degree of polymerization of 1.6, 84% methyl and 16% methylol), 303, 325, 327 and 370, which are all monomeric melamines. Suitable polymeric melamines include high amino (partially alkylated, —N, —H) melamine known as Resimene® BMP5503 (molecular weight 690, polydispersity of 1.98, 56% butyl, 44% amino), which is supplied by Solutia Inc., St. Louis, Mo., or Cymel® 1158 provided by Cytec Industries Inc., West Patterson, N.J. Cytec Industries Inc. also supplies Cymel® 1130@80 percent solids (degree of polymerization of 2.5), Cymel® 1133 (48% methyl, 4% methylol and 48% butyl), both of which are polymeric melamines.

Polyisocyanate crosslinking agents can also be used to form such an activated composition. Typical polyisocyanates that are used are provided to contain within the range of 2 to 10, preferably 2.5 to 8, more preferably 3 to 5 isocyanate functionalities. Generally, the ratio of equivalents of isocyanate functionalities on the polyisocyanate per equivalent of all of the functional groups present in the crosslinking component ranges from 0.5/1 to 3.0/1, preferably from 0.7/1 to 1.8/1, more preferably from 0.8/1 to 1.3/1.

Some suitable polyisocyanates include aromatic, aliphatic, or cycloaliphatic polyisocyanates, trifunctional polyisocyanates and isocyanate functional adducts of a polyol and difunctional isocyanates. Some of the particular polyisocyanates include diisocyanates, such as 1,6-hexamethylene diisocyanate, isophorone diisocyanate, 4,4'-biphenylene diisocyanate, toluene diisocyanate, biscyclohexyl diisocyanate, tetramethylene xylene diisocyanate, ethyl ethylene diisocyanate, 1-methyltrimethylene diisocyanate, 1,3-phenylene diisocyanate, 1,5-napthalene diisocyanate, bis-(4-isocyanatocyclohexyl)-methane and 4,4'-diisocyanatodiphenyl ether.

Some of the suitable trifunctional polyisocyanates include triphenylmethane triisocyanate, 1,3,5-benzene triisocyanate, and 2,4,6-toluene triisocyanate. Trimers of diisocyanate, such as the trimer of hexamethylene diisocyanate sold under the trademark Desmodur®N-3390 by Bayer Corporation of Pittsburgh, Pa. and the trimer of isophorone diisocyanate are also suitable. Furthermore, trifunctional adducts of triols and diisocyanates are also suitable. Trimers of diisocyanates are preferred and trimers of isophorone and hexamethylene diisocyanates are more preferred.

If desired, appropriate catalysts may also be included in the activated compositions to accelerate the curing process of a potmix of the coating composition.

When the activated compositions include melamine as the crosslinking agent, it also preferably includes a catalytically active amount of one or more acid catalysts to further enhance the crosslinking of the components on curing. Generally, catalytically active amount of the acid catalyst in the coating composition ranges from about 0.1 percent to about 5 percent, preferably ranges from 0.1 percent to 2 percent, more preferably ranges from 0.5 percent to 1.2 percent, all in weight percent based on the weight of the binder. Some suitable acid catalysts include aromatic sulfonic acids, such as dodecylbenzene sulfonic acid, para-toluenesulfonic acid and dinonylnaphthalene sulfonic acid, all of which are either unblocked or blocked with an amine, such as dimethyl oxazolidine and 2-amino-2-methyl-1-propanol, n,n-dimethylethanolamine or a combination thereof. Other acid catalysts that can be used are strong acids, such as phosphoric acids, more particularly phenyl acid phosphate, which may be unblocked or blocked with an amine.

When the activated compositions include a polyisocyanate as the crosslinking agent, the coating composition preferably includes a catalytically active amount of one or more tin or tertiary amine catalysts for accelerating the curing process. Generally, catalytically active amount of the catalyst in the coating composition ranges from about 0.001 percent to about 5 percent, preferably ranges from 0.005 percent to 2 percent, more preferably ranges from 0.01 percent to 1 percent, all in weight percent based on the weight of the binder. A wide variety of catalysts can be used, such as, tin compounds, including dibutyl tin dilaurate and dibutyl tin diacetate; tertiary amines, such as, triethylenediamine. These catalysts can be used alone or in conjunction with carboxylic acids, such as, acetic acid. One of the commercially available catalysts, sold under the trademark, Fastcat® 4202 dibutyl tin dilaurate by Elf-Atochem North America, Inc. Philadelphia, Pa., is particularly suitable.

To facilitate formulation and application of the coating compositions formulated with dispersions of the present invention, an organic solvent is utilized which is compatible with the components of the paint composition as well.

In addition, coating composition utilizing the dispersion of the present invention may contain a variety of other optional ingredients, including fillers, plasticizers, antioxidants, surfactants and flow control agents.

To improve weatherability of a finished produced of such coating compositions, an ultraviolet light stabilizer or a combination of ultraviolet light stabilizers can be added in the amount of about 0.1-5% by weight, based on the weight of the binder. The stabilizer may be added for example to a dispersion of this invention containing pigments or may be added directly to the coating composition. Such stabilizers include ultraviolet light absorbers, screeners, quenchers, and specific hindered amine light stabilizers. Also, an antioxidant can be added, in the about 0.1-5% by weight, based on the weight of the binder.

Typical ultraviolet light stabilizers that are useful include benzophenones, triazoles, triazines, benzoates, hindered amines and mixtures thereof. Specific examples of ultraviolet stabilizers are disclosed in U.S. Pat. No. 4,591,533, the entire disclosure of which is incorporated herein by reference.

Such coating composition may also include conventional formulation additives such as flow control agents, for example, "Resiflow" S (polybutylacrylate), BYK 320 and 325 (high molecular weight polyacrylates); rheology control agents, such as fumed silica.

Pigment dispersions of this invention can be added to a variety of solventborne coatings or paint compositions such as primers, primer surfacers, topcoats which may be monocoats, or basecoats of a color coat/clear coat finish.

In a preferred embodiment, pigment dispersions of the present invention are utilized in a pigmented colorcoat or basecoat over which a clear coat is applied to provide a basecoat/clearcoat finish. Also, small amounts of pigment dispersion can be added to the clear coat to provide special color or aesthetic effects such as tinting.

Coating compositions formulated with the dispersion of this invention have excellent adhesion to a variety of metallic or non-metallic substrates, such as previously painted substrates, cold rolled steel, phosphatized steel, and steel coated with conventional primers by electrodeposition. These coating composition can also be used to coat plastic substrates such as polyester reinforced fiberglass, reaction injection-molded urethanes and partially crystalline polyamides.

Coating compositions formulated with the dispersion of this invention can be applied by conventional techniques such as spraying, electrostatic spraying, dipping, brushing, flowcoating and the like. The preferred techniques are spraying and electrostatic spraying. In OEM applications, the composition is typically baked at 60°-150° C. for about 15-30 minutes to form a coating about 0.1-3.0 mils thick. When the composition is used in a basecoat/clearcoat system, the basecoat may be dried to a tack-free state and cured or preferably flash dried for a short period before the clearcoat is applied (wet-on-wet). The basecoat/clearcoat finish is then baked as mentioned above to provide a dried and cured finish. The present invention is also applicable to non-baking refinish systems, as will be readily appreciated by those skilled in the art.

The following Examples illustrate the invention. All parts and percentages are on a weight basis unless otherwise indicated. All molecular weights disclosed herein are determined by GPC (gel permeation chromatography) using a polystyrene standard.

EXAMPLES

Various copolymer dispersants were prepared and then formulated into pigment dispersions which were evaluated for performance.

Example 1

Preparation of BMA/MMA Macromonomer, 50/50% by Weight

This example illustrates the preparation of a macromonomer that can be used to form a graft copolymer dispersant. A 12-liter flask was equipped with a thermometer, stirrer, additional funnels, heating mantle, reflux condenser and a means of maintaining a nitrogen blanket over the reactants. The flask was held under nitrogen positive pressure and the following ingredients were employed.

|  | Weight (gram) |
| --- | --- |
| Portion 1 | |
| Methyl ethyl ketone | 1320.0 |
| Methyl methacrylate (MMA) | 518.4 |
| Butyl methacrylate (BMA) | 518.4 |
| Portion 2 | |
| diaquabis(borondifluorodiphenyl glyoximato) cobaltate (II), Co(DPG-BF$_2$) | 0.0622 |
| Methyl ethyl ketone | 167.9 |
| Portion 3 | |
| 2,2'-azobis(methylbutyronitrile) (Vazo ® 67 by DuPont Co., Wilmington, DE) | 8.49 |
| Methyl ethyl ketone | 110 |
| Portion 4 | |
| Methyl methacrylate (MMA) | 2073.6 |
| butyl methacrylate (BMA) | 2073.6 |
| Portion 5 | |
| 2,2'-azobis(methylbutyronitrile) (Vazo ® 67 by DuPont Co., Wilmington, DE) | 84.9 |
| Methyl ethyl ketone | 1100 |
| Total | 7975.352 |

Portion 1 mixture was charged to the flask and the mixture was heated to reflux temperature and refluxed for about 20 minutes. Portion 2 solution was then added to the flask over 5 minutes and the reaction mixture was refluxed for 10 minutes. Portion 3 was then added over 5 minutes while the reaction mixture was held at reflux temperature. Portion 4 and Portion 5 were then simultaneously fed to the reactor over 240 minutes while the reaction mixture was held at reflux temperature throughout the course of additions. Reflux was continued for another 2 hours and the solution was cooled to room temperature and filled out. The resulting product was a light yellow clear polymer solution and had a solid content of about 63.9%. The macromonomer had a 5,353 Mw and 3,348 Mn as measured by GPC using polystyrene as the standard.

Example 2

Preparation of a Graft Copolymer with Quaternized Ammonium Group

This example shows the preparation of a graft copolymer dispersant used in this invention containing quaternized ammonium groups, specifically methyl acrylate-co-2-hydroxyethyl acrylate-co-N,N-dimethylaminoethyl acrylate (methyl p-toluene sulfonate)-g-butyl methacrylate-co-methyl methacrylate, 13.53/7.73/2.90(3.39)//36.23/36.23% by weight, from a macromonomer prepared above.

A 5-liter flask was equipped as in Example 1. The flask was held under nitrogen positive pressure and the following ingredients were employed.

|  | Weight (gram) |
|---|---|
| Portion 1 | |
| macromonomer of Example 1 | 1956.8 |
| ethyl acetate | 21.1 |
| Portion 2 | |
| methyl acrylate | 237.4 |
| N,N-dimethylaminoethyl acrylate | 135.6 |
| 2-hydroxyethyl acrylate | 50.8 |
| Portion 3 | |
| Ethyl acetate | 42.4 |
| Portion 4 | |
| t-butyl peroctoate (Elf Atochem North America, Inc., Philadelphia, PA) | 27.1 |
| ethyl acetate | 148.4 |
| Portion 5 | |
| Ethyl acetate | 21.1 |
| Portion 6 | |
| Methyl p-toluene sulfonate (Aldrich Chemical Co., Milwaukee, WI) | 59.5 |
| Amyl acetate | 1172.0 |
| Portion 7 | |
| Amyl acetate | 442.5 |
| Total | 4272.3 |

Portion 1 mixture was charged to the flask and the mixture was heated to reflux temperature and refluxed for about 10 minutes. Portion 2 and 4 were simultaneously added over 3 hours while the reaction mixture was held at reflux temperature. Portion 3 was used to rinse the Portion 2 into the reactor at the end of addition, and Portion 5 was used to rinse the Portion 4. The reaction mixture was refluxed for another 1.5 hours. Portion 6 solution was added. The reaction mixture was distilled to remove about 800.7 grams of volatile solvents. Portion 7 was added. After cooling the product was filled out to yield a 50.1% polymer solution. This graft copolymer contains a copolymer of methyl acrylate, 2-hydroxyethyl acrylate, and N,N-dimethylaminoethyl acrylate (90% quatemized with methyl p-toluene sulfonate) in the backbone and a random copolymer of butyl methacrylate and methyl methacrylate in the arms. The graft copolymer had a Gardner-Holtz viscosity of Y-1/4.

Example 3

Preparation of a Block Copolymer with Quaternized Ammonium Group

This example shows the preparation of a block copolymer used in this invention containing quaternized ammonium groups, specifically N,N-dimethylaminoethyl methacrylate (methyl p-toluene sulfonate)-b-butyl methacrylate-co-methyl methacrylate, 10.64(11.34)//39.01/39.01% by weight, from a macromonomer prepared above.

A 5-liter flask was equipped as in Example 1. The flask was held under nitrogen positive pressure and the following ingredients were employed.

|  | Weight (gram) |
|---|---|
| Portion 1 | |
| Macromonomer of Example 1 | 2057.85 |
| Ethyl acetate | 180.0 |
| Portion 2 | |
| N,N-Dimethylaminoethyl methacrylate | 182.4 |
| Portion 3 | |
| t-Butyl peroctoate (Elf Atochem North America, Inc., Philadelphia, PA) | 10.0 |
| Ethyl acetate | 150.0 |
| Portion 4 | |
| t-Butyl peroctoate (Elf Atochem North America, Inc., Philadelphia, PA) | 1.0 |
| Ethyl acetate | 15.0 |
| Portion 5 | |
| Methyl p-toluene sulfonate (Aldrich Chemical Co., Milwaukee, WI) | 194.46 |
| Amyl acetate | 1049.9 |
| Portion 6 | |
| Amyl acetate | 514.0 |
| Total | 4354.61 |

Portion 1 mixture was charged to the flask and the mixture was heated to reflux temperature and refluxed for about 10 minutes. Portion 2 and 3 were simultaneously added over 3 hours while the reaction mixture was held at reflux temperature. The reaction mixture was refluxed for another 0.5 hours. Portion 4 solution was added in 5 minutes. The reaction mixture was refluxed for 2 hours. Portion 5 was added and 750.0 grams of volatile solvent mixtures was removed by gradually raising the temperature. The reflux was continued for a total reaction time of 3 hours including the time needed to remove the volatile solvents. The Portion 6 was added. After cooling the product was filled out to yield a 48.1% polymer solution. This block copolymer contains N,N-dimethylaminoethyl methacrylate (90% quaternized with methyl p-toluene sulfonate) in one block and a random copolymer butyl methacrylate and methyl methacrylate in the other. The block copolymer solution had a Gardner-Holtz viscosity of S.

Example 4

Preparation of a Low MW Acrylic Polymer: Sty/MMA/EHA/HEMA/IBOMA/BMA, 10/10/15/30/10/25% by Weight This example illustrates the preparation of a low molecular weight acrylic polymer to be used in the dispersion. A 12-liter flask was equipped with a thermometer, stirrer, additional funnels, heating mantle, reflux condenser and a means of maintaining a nitrogen blanket over the reactants. The flask was held under nitrogen positive pressure and the following ingredients were employed.

|  | Weight (gram) |
|---|---|
| Portion 1 | |
| Butyl acetate | 1489.83 |

-continued

| | Weight (gram) |
|---|---|
| Portion 2 | |
| Styrene (Sty) | 447.95 |
| Methyl methacrylate (MMA) | 1119.86 |
| 2-Ethylhexyl acrylate (EHA) | 671.92 |
| 2-Hydroxyethyl methacrylate (HEMA) | 1343.84 |
| Isobornyl methacrylate (IBOMA) | 447.95 |
| Butyl methacrylate (BMA) | 447.95 |
| Portion 3 | |
| t-butyl peroxyacetate (Lupersol 70, 75%, Elf Atochem North America, Inc., Philadelphia, PA) | 418.08 |
| Butyl acetate | 725.56 |
| Portion 4 | |
| Butyl acetate | 87.07 |
| Total | 7200.01 |

Portion 1 was charged to the flask and heated to reflux temperature. Portion 2 and 90% of the Portion 3 were simultaneously fed to the reactor over 300 minutes. The reaction mixture was held at reflux temperature throughout the course of the additions. The reaction mixture was refluxed for 30 minutes, then the remaining 10% of the Portion 3 was fed to the reactor over 30 minutes. At the end of the feed, Portion 4 was used to rinse the feed line and Reflux was continued for another 2 hours. The polymer solution was cooled to room temperature and filled out. The resulting polymer solution was clear and had a solid content of about 66.6% and a Gardner-Holt viscosity of Y. The polymer had a 5,591 Mw and 2,985 Mn based on GPC using polystyrene as the standard.

Example 5

Preparation of a Pigment Dispersion

| | Weight (gram) |
|---|---|
| Portion 1 | |
| Butyl acetate | 115.0 |
| Polymer of Example 2 | 31.6 |
| Polymer of Example 4 | 210.8 |
| Solsperse 5000 (Avecia Pigment & Additive, Charlotte, NC) | 2.6 |
| Portion 2 | |
| Blue pigment, Hostaperm Blue BT-729-D (Clariant Corp., Coventry, RI) | 40.0 |
| Total | 400.0 |

Portion 1 mixture was charged to an attritor (Union Process Inc., Akron, Ohio, Model 01) and stirred until it's well mixed. The pigment sample had a pH value of 5.5 as measured by the supplier. Portion 2 was added and the mixture was stirred for another 5 minutes. The grinding media, 896 grams of 0.8 mm glass beads was added and the dispersion mixture was ground for 44 minutes. The dispersion was then separated from the grinding media using a paint screen. The dispersion was drawn down on a Mylar base to make sure the haze level was low.

Example 6

The procedure of Example 5 was repeated except that a pigment sample having a surface pH value of 5.6 was used.

Example 7

The procedure of Example 5 was repeated except that a pigment sample having a surface pH value of 7.0 was used.

Example 8

The procedure of Example 5 was repeated except that a pigment sample having a surface pH value of 7.4 was used.

All dispersion samples had similar haze level indicating they were ground to comparable particle size. The viscosity of the resulting pigment dispersions from Example 6 to 9 was measured with a Brookfield Viscometer using a #2 or #3 spindle at 20 rpm. The results are summarized below.

| Example # | pH | Viscosity (cps) |
|---|---|---|
| 5 | 5.5 | 1,455 |
| 6 | 5.6 | 1,286 |
| 7 | 7.0 | 1,940 |
| 8 | 7.4 | 2,485 |

It is clear that the pigment with low surface pH values gave dispersions with better rheology.

Example 9

| | Weight (gram) |
|---|---|
| Portion 1 | |
| Butyl acetate | 108 |
| Polymer of Example 2 | 63.9 |
| Polymer of Example 4 | 120 |
| Portion 2 | |
| Red pigment, Violet R NRT-887-D (Ciba Specialty Chemicals Corp, Newport, DE) | 108 |
| Total | 400 |

The procedure of Example 6 was followed to make the pigment dispersion. The pigment sample had a surface pH value of 6.5.

Example 10

The procedure of Example 9 was repeated except that a pigment sample having a surface pH value of 6.6 was used.

Example 11

The procedure of Example 9 was repeated except that a pigment sample having a surface pH value of 8.0 was used.

All dispersion samples had similar haze level indicating they were ground to comparable particle size. The viscosity of the resulting pigment dispersions from Example 9 to 11 was measured with a Brookfield Viscometer using a #2 or #3 spindle at 20 rpm. The results are summarized below.

| Example # | pH | Viscosity (cps) |
| --- | --- | --- |
| 9 | 6.5 | 344 |
| 10 | 6.6 | 214 |
| 11 | 8.0 | 10,550 |

It is clear that the pigment with surface pH value greater than 7.0 gave dispersions with very poor rheology.

Example 12

| | Weight (gram) |
| --- | --- |
| Portion 1 | |
| Butyl acetate | 108.1 |
| Polymer of Example 3 | 63.9 |
| Polymer of Example 4 | 120.0 |
| Portion 2 | |
| Red pigment, Violet R NRT-887-D (Ciba Specialty Chemicals Corp, Newport, DE) | 108.0 |
| Total | 400.0 |

The procedure of Example 6 was followed to make the pigment dispersion. The pigment sample had a surface pH value of 6.0.

Example 13

The procedure of Example 9 was repeated except that a pigment sample having a surface pH value of 6.7 was used.

Example 14

The procedure of Example 9 was repeated except that a pigment sample having a surface pH value of 8.0 was used.

All dispersion samples had similar haze level indicating they were ground to comparable particle size. The viscosity of the resulting pigment dispersions from Example 9 to 11 was measured with a Brookfield Viscometer using a #2 or #3 spindle at 20 rpm. The results are summarized below.

| | Example 12 | Example 13 | Example 14 |
| --- | --- | --- | --- |
| Pigment pH | 6.0 | 6.7 | 8.0 |
| Brookfield | | | |
| V01 (cps) | 1600 | 2600 | 5100 |
| V20 (cps) | 420 | 995 | 2080 |
| V50 (cps) | 366 | 804 | 1500 |
| Rotovisco | | | |
| Shear Rate (1/sec.) | 21.3 | 21.1 | 21.3 |
| Viscosity (cps) | 309 | 546 | 824 |

It is clear that the pigment with surface pH value greater than 7.0 gave dispersions with very poor rheology.

Various modifications, alterations, additions or substitutions of this invention will be apparent to those skilled in the art without departing from its spirit and scope. Accordingly, this invention is not limited by the illustrative embodiments set forth herein, but rather is defined by the following claims.

The invention claimed is:

1. A solvent based pigment dispersion useful for forming solventborne coating compositions, comprising:
   (a) a copolymer pigment dispersant having at least one quaternary ammonium functional group;
   (b) a pigment having a pH below 7.0; and
   (c) an organic liquid carrier
wherein the pigment dispersant is an AB block copolymer that comprises an adsorbing segment and a stabilizing segment and wherein said adsorbing segment comprises up to 40 percent by weight, based on the total weight of said adsorbing segment, of ethylenically unsaturated monomers having a quaternary ammonium functional group.

2. The dispersion of claim 1, wherein the dispersion contains about 1 to 50% of copolymer dispersant, and 20 to 90% of organic liquid carrier, and the dispersant to pigment ratio is in the range of about 1/100 to 500/100.

3. The dispersion of claim 1, wherein the dispersion has a low shear viscosity in the range of about 50 to 10,000 Cps at 25° C. at a shear rate of 1 sec$^{-1}$.

4. The dispersion of claim 1, wherein the dispersion has a low shear viscosity below about 1,500 Cps at 25° C. at a shear rate of 1 sec$^{-1}$.

5. The dispersion of claim 1, wherein the pigment surface is either chemically or physically modified to contain acidic groups.

6. A solventborne coating composition, useful for coating a substrate, which composition comprises an organic liquid carrier and a film forming binder and about 0.1-50% by weight of the pigment dispersion of claim 1.

7. The coating of claim 6, further including a crosslinking agent.

8. The coating of claim 7, wherein the crosslinking agent is selected from the groups consisting of alkylated melamines and polyisocyanates.

9. A substrate coated with a dried and cured layer of the composition of claim 7.

10. A substrate coated with a dried layer of the composition of claim 6.

11. A process for improving the rheology of solvent based pigment dispersions containing an AB block copolymer dispersant having at least one quaternary ammonium functional group, comprising the steps of
   (a) selecting a pigment for use therein having a pH less than 7.0; and
   (b) dispersing the pigment in the copolymer dispersant and solvent to form the pigment dispersion;
wherein said AB block copolymer comprises an adsorbing segment and a stabilizing segment and wherein said adsorbing segment comprises up to 40 percent by weight, based on the total weight of said adsorbing segment, of ethylenically unsaturated monomers having a quaternary ammonium functional group.

* * * * *